United States Patent Office 2,902,493
Patented Sept. 1, 1959

2,902,493
THIOPHOSPHORIC ACID ESTERS AND PROCESS FOR THEIR PRODUCTION

Walter Lorenz, Wuppertal-Elberfeld, and Gerhard Schrader, Opladen, Germany, assignors to Farbenfabriken Bayer Aktiengesellschaft, Leverkusen, Germany, a corporation of Germany No Drawing. Application May 10, 1956
Serial No. 583,947

Claims priority, application Germany May 13, 1955

2 Claims. (Cl. 260—326.5)

This invention relates to thiophosphoric acid esters and to a process for their production; more particularly it concerns thiophosphoric acid esters of the general formula

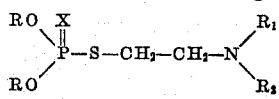

in which R stands for alkyl, $R_1+R_2$ are parts of a heterocyclic ring system and X stands for a member selected from the group consisting of oxygen and sulphur.

German patent specification 927,092 describes O,O-dialkyl-O-($\beta$-acylaminoethyl)-thionophosphoric acid esters which distinguish themselves as insecticides whilst having a slight toxic action on warm-blooded animals. They are obtained by reacting thionophosphoric acid chlorides with $\beta$-oxethylamides, which are acylated, preferably diacylated, at the nitrogen atom.

Thiolphosphoric acid esters which are isomers of some of these known compounds or thiono-thiol-phosphoric acid esters may be obtained by reacting $\beta$-halogen ethyl derivatives, preferably $\beta$-bromethyl derivatives, of diacylimino compounds such as phthalimide, succinimide, or benzoic acid sulphimides, or of compounds the heterocyclic nitrogen atom of which possesses marked acid properties such as benzotriazole, with salts, e.g. alkali metal salts such as sodium and potassium salts, of dialkyl-thioor dithio-phosphoric acids. As an alternative, instead of the salts of the thiophosphoric acids, the free acids themselves may be reacted with the above mentioned $\beta$-halogenethyl compounds in the presence of a tertiary base such as pyridine, trimethyl amine, triethyl amine and N-methyl piperidine.

It is of advantage to conduct the process in an organic solvent, e.g. lower alcohols, ketones, hydrocarbons, halogenated hydrocarbons and dioxane. The reaction can be carried out at temperatures between 0 and 150° C., preferably between 50 and 100° C.

The new esters have marked aphicidal as well as acaricidal action, and are useful as pest control agents.

The following examples are given for the purpose of illustrating the invention.

Example 1

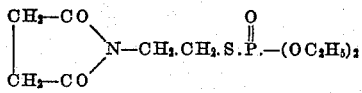

24.3 grams (0.13 mols) of the ammonium salt of diethyl thiophosphoric acid are boiled for one hour together with 20.6 grams (0.1 mol) of $\beta$-bromethyl succinimide in 200 millilitres of dioxane. After cooling, the mixture is filtered by suction to remove ammonium bromide, the solvent is distilled off under vacuum and the remaining oil is taken up in benzene. After washing with water the benzene solution is dried over sodium sulphate and the solvent is distilled off. 15 grams of O,O-diethyl-S-(succiniminoethyl)-phosphate are obtained as a reddish yellow oil, sparingly soluble in water.

Example 2

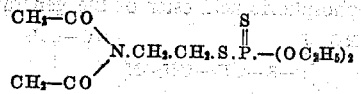

412 grams (2 mols) of $\beta$-bromethyl succinimide and 406 grams (2 mols) of the ammonium salt of diethyldithiophosphoric acid are heated with stirring to 80 to 90° C. for 2 hours together with some copper powder in 1 litre of methyl ethyl ketone. After cooling, the mixture is filtered by suction to remove ammonium bromide. The solvent is distilled off under vacuum and the remaining oil taken up in benzene. The benzene solution is first washed with aqueous ammonia, then with water, dried over sodium sulphate and the solvent is then distilled off; 547 grams of O,O-diethyl-S-(succinimino ethyl)-thionophosphate is obtained as a yellowish red oil, insoluble in water. (Yield: 88.5 percent of theoretical.)

Example 3

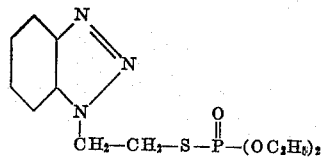

22.6 grams of 1-($\omega$-bromethyl)-benzotriazole and 25 grams of the ammonium salt of diethyl-thiophosphoric acid are boiled for 2 hours in 200 millilitres of dioxane. The mixture is worked up as described in the preceding examples. 20 grams of O,O-diethyl-S-($\omega$-ethylbenzotriazolyl)-thiophosphate are obtained as a pale red water-insoluble oil.

Example 4

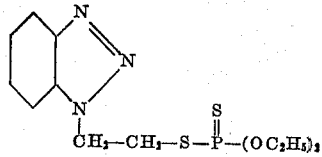

22.6 grams of 1-($\omega$-bromethyl)-benzotriazole and 22.4 grams of the potassium salt of diethyl-dithiophosphoric acid are boiled in 200 millilitres of dioxane for 2 hours. After cooling, the mixture is poured into water and the oil separated out is taken up in benzene. The benzene solution is washed with water, and dried over sodium sulphate. After distilling off the solvent, 22 grams of O,O-diethyl-S-($\omega$-ethyl-benzotriazolyl)-dithiophosphate is obtained as a red water-insoluble oil.

Example 5

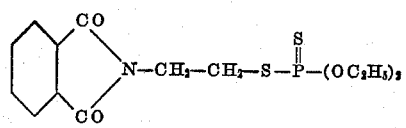

38 grams (0.2 mol) of diethyl-dithiophosphoric acid are dissolved with cooling in 100 millilitres of pyridine. 51 grams (0.2 mol) of $\beta$-bromethyl phthalimide are added to this solution which is then heated to 60° C. for 2 hours. After cooling, the mixture is poured into water, the oil separated out is taken up in benzene, first washed with dilute hydrochloric acid, then with water, and dried over sodium sulphate. After distilling off the solvent, 52 grams of O,O-diethyl-S-(ethyl phthalimino)-dithiophosphate are obtained as a pale yellow, viscous oil. Yield 66 percent.

We claim:
1. A compound of the general formula
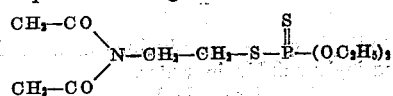
2. A thiophosphoric acid ester of the general formula
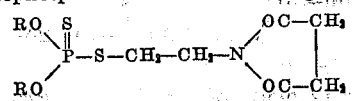
wherein R stands for a lower alkyl radical.
References Cited in the file of this patent
UNITED STATES PATENTS
| | | |
|---|---|---|
| 2,736,726 | Gaetzi et al. | Feb. 28, 1956 |
| 2,767,194 | Fancher | Oct. 16, 1956 |
FOREIGN PATENTS
| | | |
|---|---|---|
| 930,446 | Germany | July 18, 1955 |
| 713,278 | Great Britain | Apr. 21, 1952 |

UNITED STATES PATENT OFFICE
CERTIFICATE OF CORRECTION

Patent No. 2,902,493                 September 1, 1959

Walter Lorenz et al.

It is hereby certified that error appears in the printed specification of the above numbered patent requiring correction and that the said Letters Patent should read as corrected below.

Column 2, lines 4 to 7, Example 2, the formula should appear as shown below instead of as in the patent:

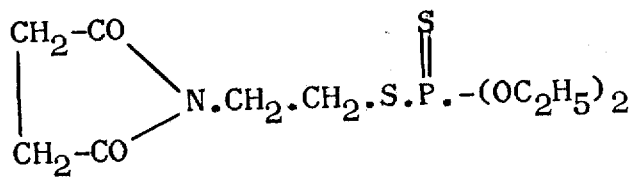

column 3, lines 3 to 6, claim 1, the formula should appear as shown below instead of as in the patent:

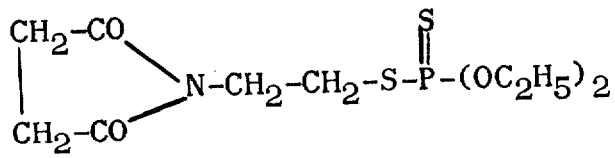

Signed and sealed this 16th day of August 1960.

(SEAL)
Attest:

KARL H. AXLINE
Attesting Officer

ROBERT C. WATSON
Commissioner of Patents